United States Patent
Yerli et al.

(10) Patent No.: US 9,005,024 B2
(45) Date of Patent: Apr. 14, 2015

(54) MULTI-USER COMPUTER-CONTROLLED VIDEO GAMING SYSTEM AND A METHOD OF CONTROLLING AT LEAST ONE GAME MECHANIC

(75) Inventors: Cevat Yerli, Frankfurt am Main (DE); Alexander Taube, Frankfurt am Main (DE); Peter Holzapfel, Frankfurt am Main (DE)

(73) Assignee: Crytek GmbH, Frankfurt am Main (DE)

( * ) Notice: Subject to any disclaimer, the term of this patent is extended or adjusted under 35 U.S.C. 154(b) by 522 days.

(21) Appl. No.: 13/043,557

(22) Filed: Mar. 9, 2011

(65) Prior Publication Data

US 2011/0223996 A1    Sep. 15, 2011

Related U.S. Application Data

(60) Provisional application No. 61/311,834, filed on Mar. 9, 2010.

(51) Int. Cl.
G06F 17/00 (2006.01)
A63F 13/40 (2014.01)
A63F 13/30 (2014.01)

(52) U.S. Cl.
CPC ............... *A63F 13/10* (2013.01); *A63F 13/12* (2013.01); *A63F 2300/535* (2013.01); *A63F 2300/5546* (2013.01); *A63F 2300/6027* (2013.01); *A63F 2300/6045* (2013.01); *A63F 2300/61* (2013.01); *A63F 2300/6676* (2013.01); *A63F 2300/8023* (2013.01); *A63F 2300/8088* (2013.01)

(58) Field of Classification Search
USPC ............. 463/1–6, 40–42, 30–33; 725/13
See application file for complete search history.

(56) References Cited

U.S. PATENT DOCUMENTS

| | | | |
|---|---|---|---|
| 2003/0079218 A1* | 4/2003 | Goldberg et al. | 725/13 |
| 2005/0143156 A1* | 6/2005 | Herrmann et al. | 463/9 |
| 2006/0293103 A1* | 12/2006 | Mendelsohn | 463/42 |
| 2008/0158232 A1* | 7/2008 | Shuster | 345/474 |
| 2008/0161007 A1* | 7/2008 | Burgess et al. | 455/450 |
| 2010/0255894 A1* | 10/2010 | Kidakarn et al. | 463/2 |
| 2011/0175809 A1* | 7/2011 | Markovic et al. | 345/158 |

OTHER PUBLICATIONS

Pokemon Snap Game Manual, released 1998.*

* cited by examiner

*Primary Examiner* — Ronald D Laneau
*Assistant Examiner* — Ross Williams
(74) *Attorney, Agent, or Firm* — Christensen O'Connor Johnson Kindness PLLC

(57) ABSTRACT

System and method for running a software application, such as a video game for many users. In one embodiment a multi-user computer-controlled video gaming system comprising: at least one display device for displaying video game motion pictures to the plurality of users; a plurality of user input devices, at least one for each user, providing user input data to the computer-controlled video gaming system; a processing unit receiving and processing the user input data from the plurality of input devices to generate control input data for a conjointly control of at least one game mechanic of the performed game; at least one computing device executing a game software application for performing said game, the at least one computing device being controlled by said control input data for providing output to the display device to display the video game motion pictures dependent on said at least one conjointly controlled game mechanic.

21 Claims, 12 Drawing Sheets

MULTI-USER COMPUTER-CONTROLLED VIDEO GAMING SYSTEM AND A METHOD OF CONTROLLING AT LEAST ONE GAME MECHANIC

CROSS-REFERENCE TO RELATED APPLICATION

This application claims the benefit of U.S. Provisional Application No. 61/311,834, filed Mar. 9, 2010.

FIELD OF THE INVENTION

The present invention relates to a multi-user computer-controlled video gaming system and to a method of controlling at least one game mechanic for running games and similar applications on this system. In particular the present invention relates to a system and a method for providing game mechanics which are conjointly controllable by a plurality of users who belong to an audience at a theater, a cinema or at any other location of presentation.

BACKGROUND OF INVENTION

Multi-user computer-controlled video gaming systems are well-known to be provided by Personal Computers or game consoles. These systems mainly include a computing device, i.e. the PC or console, a display device such as a monitor or TV screen, and two or more user input devices such as gamepads, joysticks etc. These systems are limited to a lower number of users and thus cannot be used to provide games and entertainment to a larger group or audience having e.g. 50, 100 or even more users (players).

In order to extend the number of players new systems have been developed for so-called theater gaming which is a modern technology in the field of computer-based games. These systems comprise cinema equipment, a server and gamepads so that a large group of players, i.e. the theater audience, can jointly play computer games. Such a system is disclosed in U.S. Pat. No. 6,257,982 B1 which describes a large screen, interactive, computer-controlled motion picture theater video gaming system. The system comprises display devices (video projector with a large screen), a computing device (computer) for outputting video data to be outputted by the display devices. In order to provide user-control for running the game there are several user input devices (called "user stations"), one for each user and his/her individual input. These input devices have basically the normal design of game controllers, i.e. they have buttons, sticks, sliders and the like which are to be pressed or moved by the respective user. This means that each input device generates input data depending on the individual input of the respective user, the input data being sent to the computer for controlling the game, in particular for controlling the behavior of the user's avatar (personal game character) during the running game. Thus each user can participate to the game by interactively controlling his/her avatar or an associated object, like a car, a motorbike etc. However, it would be desirable to have also a conjointly control of the same object by two or more users during a running game.

In other words: In classical interactive game applications the individual players just can control their personal avatars and may then get individual feedback onscreen and/or via sound, gamepad vibration etc. Applications that allow huge groups to interact together need a completely different concept of control and feedback to satisfy users with an enjoyable experience. At present the known video gaming systems do not provide a conjointly control of the same object by two or more users during a running game. In particular there are no systems or method for providing control input data for a conjointly multi-user control of a certain object, such as an avatar or a group of game characters being displayed in video game motion pictures.

Game mechanics are known as such to be a construct of rules intended to produce an enjoyable game or gameplay. All games use mechanics; however, theories and styles differ as to their ultimate importance to the game. In general, the process and study of game design is the effort to come up with game mechanics that allow for people playing a game to have a fun and engaging experience. For example in U.S. Pat. No. 7,216,870 a resource point game mechanic is disclosed. Since the prior art games are not designed to be played by a large larger group or audience having e.g. 50, 100 or even more users (players), the known game mechanics cannot manage the inputs from so many players. Thus there is a need for new game mechanics which are controllable by a large group of players. In particular cinema games have unique constraints compared to regular computer and video games. All players share one big screen and interact with the same objects. Further to this the game has to work in the same manner independent on how many players play the game, may this be only a few or several hundreds of players. These constraints demand a different approach to the game design and call for different mechanics to allow all players to feel in control of the game and to understand the feedback the group gets as much as understand their personal feedback.

SUMMARY

According to a first aspect of the present invention there is provided a multi-user computer-controlled video gaming system for performing a game among a plurality of users, the system comprising:
  at least one display device for displaying video game motion pictures to the plurality of users;
  a plurality of user input devices, at least one for each user, providing user input data to the computer-controlled video gaming system;
  a processing unit receiving and processing the user input data from the plurality of input devices to generate control input data for a conjointly control of at least one game mechanic of the performed game;
  at least one computing device executing a game software application for performing said game, the at least one computing device being controlled by said control input data for providing output to the display device to display the video game motion pictures dependent on said at least one conjointly controlled game mechanic.

Further to this and in correspondence with said system there is disclosed a method of preparing input data for running a game in a multi-user computer-controlled video gaming system, the system comprising at least one display device, a plurality of user input devices, a processing unit and at least one computing device executing a game software application, the method comprising the steps of:
  providing user input data which are generated by the plurality of user input devices;
  receiving and processing the user input data by the processing unit to generate control input data for a conjointly control of at least one object to be displayed in video game motion pictures.

Thus a video game (or any other software application) is provided with game mechanics which can be conjointly controlled by a large group or crowd of users (players).

In the present invention game mechanics for interactive gaming experiences for social crowd games, such as interactive cinema gaming, are described. In particular 3D cinema gaming thus enables a crowd to collectively control a game that responds to the user input(s) and render the resulting scene in real time on the cinema screen.

The user(s) can input data into the application via a controller or other alternatives, such as indirectly via a camera or microphones recording the audience or directly via a wired or wireless input device or another application (e.g. running on a mobile phone). The input method can vary and is as such not limited in any way to a specific system. The user's or player's input(s) is/are used in the game to control specific objects, visible or not visible, be this characters (avatars), vehicles or other objects such as balls or the like. The input can also be used to control certain game elements that are not directly linked to a certain object, like elements influencing the game world in an indirect way (e.g. pumping water to fill a basin, voting for certain choice etc.). Further, the players are able, depending on the game, to control more than one object or element. In this case any amount of players is able to control any amount of objects in the game. The described mechanics are the same and can be applied to any combination of players and objects/elements that are controllable.

In particular at least one of the following game mechanics are proposed:
  Adapting the number of allowed players,
  Adapting the decision making for triggering a function,
  Adapting a difficulty level,
  Adapting a score system,
wherein the adapting is based on the activity of the users in terms of quantity and/or quality.

Moreover, at least one of the following game mechanics are further or alternatively proposed:
  Moving objects on predefined paths,
  Triggering a function, in particular a photo-camera function,
  Targeting movements,
  Displaying an awaking effect (e.g. head bobbing),
  Re-displaying pictures or sketches thereof,
  Pre-displaying pictures or sketches thereof,
  Pre-displaying objects or sketches thereof.

The present invention is applicable to any user-controllable software application providing outputs to users such as video and/or audio outputs or even electro-mechanical outputs such as vibration of user devices etc. In particular the present invention allows to run software applications in the field of group gaming taking into account even hundreds of users' inputs. The proposed game mechanics are designed to be controllable by many users, since there is an intelligent evaluation of the many individual inputs to generate few (one or some) control input data which can instantly be processed by the application. Thus the invention can preferably be applied to enhanced cinema or theater gaming systems.

It is to be understood that the invention is not restricted to video games, but can be applied to any computer-based application for providing entertainment or information to a plurality of users. Based on the needs of the application the incoming user input data is sorted, filtered and compressed to transfer a processed control input data to the actual application.

In preferred embodiments of the invention the at least one computing device is realized by a workstation or a game server and the processing unit is realized as an external or internal part of said workstation or server.

BRIEF DESCRIPTION OF THE DRAWINGS

Further features and advantages of the present invention, as well as the structure and operation of various illustrative embodiments of the present invention, are described in more detail below with reference to the accompanying schematic drawings, wherein.

DETAILED DESCRIPTION OF PREFERRED EMBODIMENTS

The present invention relates to a multi-user computer-controlled video gaming system for running a software entertainment application having enhanced game mechanics which allow two or more users, even hundreds of users, to conjointly control said game mechanics. Thus each user or player gets a reliable feeling of being a full member of the game in terms of having individual impact on the game as well as of being part of the group in terms of contributing to a collective impact on the game.

Further to this the course of the game is under reliable control of the audience can reflect the behavior of behavior of the whole group as well as the social relationship and divergence among the users.

The inventors have recognized that cinemas or theaters are one of the best confined spaces for social groups, but there are so far no gaming systems which provide interactive entertainment for an audience, i.e. a larger group of players. Apart from missing technical equipment infrastructure no software solution has been proposed so far to which could provide a game for a large group gathered in one room using only one screen in a satisfying manner. This is due to a variety of problems, such as the following:

The system has to be aware of the amount of players playing the game. The system has to take into account the skill level of players that play the game. The system has to be rewarding for players of every skill level and still provide a challenge The system has to make players feel in control of the avatar or more than one avatar the players are controlling as a crowd.

With the present invention a collection of new enhanced gaming mechanics is provided that leads to a successful design of games for cinemas and for similar scenarios. The invention enables a crowd to collectively control a game that responds to input and render the resulting scene in real time on the cinema screen.

Figure 1:
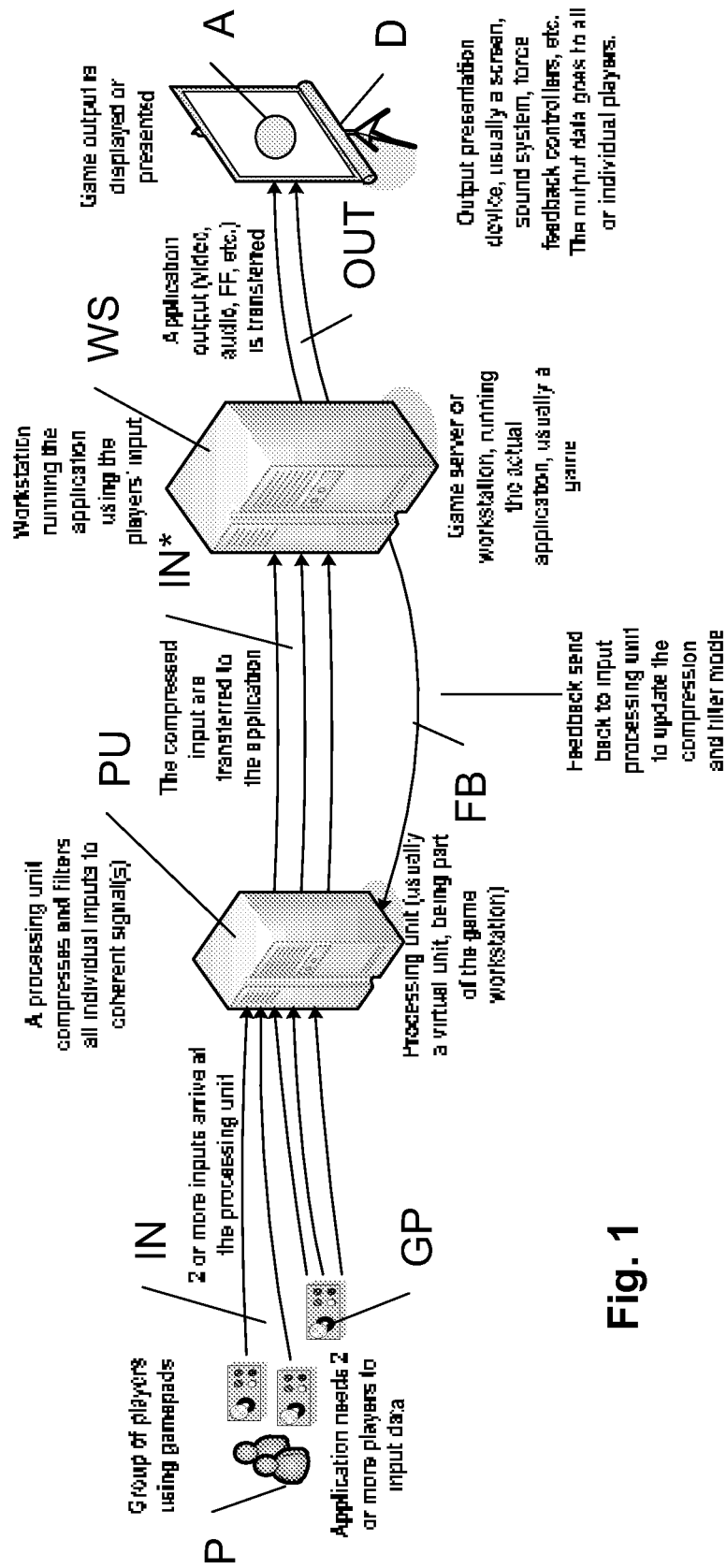
FIG. 1 shows the architecture of a multi-user computer-controlled video gaming system of the present invention.

In FIG. 1 there is shown a multi-user computer-controlled video gaming system which can be installed in a cinema or theater. The game which is performed here by the system is called "Photo Safari Undersea" and is meant to be a game for a plurality of users who conjointly steer a submarine through an exciting undersea world to explore interesting objects and/or places (e.g. fishes, corals, shelfs, wrecks etc.). The submarine is equipped with a photo-camera which can be moved and activated by the group of users in order to take pictures of interesting objects or places. The system comprises at least one display device being represented by a large screen D on which video game motion pictures are projected and to be shown to the audience of two or more users. The system (also see FIG. 2) further comprises at least one computing device which is represented here by a workstation WS executing a game software application and providing output OUT (video/audio signal) to the display device D. Accordingly video game motion pictures of the undersea world with at least one conjointly controlled object, such as the submarine A, are displayed. The movement of said submarine A and/or the function of further objects, such as the camera B, can conjointly be controlled by the users. Therefore the individual user input data IN coming from a plurality of user input devices GP (gamepads) are evaluated and/or processed in a processing unit PU and/or in the workstation WS according to new game mechanics which are presented here.

In one example the game mechanics are applied to said user input data IN for generating control input data IN* which allow a conjointly control of a certain object, such as the submarine A and/or the camera B. The processing unit PU can be an integral part of the workstation WS, but in the embodiment shown in FIG. 1 the processing unit PU is realized by a separate unit being installed apart from but being connected with said workstation WS, e.g. by a local area network.

The processing unit PU receives the individual user input data IN which are just raw data and continuously processes these data to generate control data IN* for a conjointly control of said objects A and/or B. Apparently the application, i.e. the game software running on workstation WS, needs readable control data (instructions or commands) like "submarine A moves forward", but the raw data IN coming from the users do not provide such discreet commands and are very voluminous. To overcome this problem, the invention generates discreet control input data IN* by processing the incoming user input data IN in such a way that the application can easily handle these data IN* and interpret/understand the commands thereof. Since the control data IN* are derived from many individual user input data, these data IN* reflect the shared and joint will of the users being involved. The method of controlling the game running on said system by using at least one game mechanic will be described further below:

One of the game mechanics which are disclosed here is called "Adaptive Player Amount" (APA). This APA allows to adapt the amount or number of allowed players and thus to optimize the collective impact on the course of the game.

The players can enter the session at any time during the gameplay. Preferably inactive players shall not be taken into account for decision making. When a new player enters the cinema he or she can log into the game via his/her gamepad GP which can be a wireless controller or any other human input/interface device. The game starts on time with all logged in controllers and players.

However some members of the audience or even logged-in players might not always want to actively contribute to the running game. For example some user might not want to play and therefore does not log into the game. Other users might want to play later after having watched how the others are playing. Some users might want to play but are late and miss to log in when the game starts. Others might want to stop playing after a while and then want to be inactive and only watch the others playing. Or some users might want to play from the beginning, then stop playing for a while and then want to start playing again.

For such cases the APA game mechanics is a perfect solution since the amount of allowed players perceived by the system can continuously be adapted to the actual amount of active players.

For running the APA game mechanics each controller (see gamepad GP in FIG. 2) is assigned a unique ID and is recognized by the game server (workstation WS) with its unique ID. Each controller that is actually used sends data IN to the server. These controllers are registered for the first time they are used and are then activated. Every activated controller is considered in the course of the game by processing its input data IN for calculations. Preferably every activated controller has a timeout time that is defined by the application running on the server WS. If a controller stops sending input data IN for more than the timeout period this controller will be is deactivated and thus not be taken into account for calculations performed by the application. If the controller starts sending data again, i.e. the user is pressing a button again, the controller will be recognized to be activate again. The system is always aware of the correct number of players playing the game.

In other words: The system adapts the number of allowed players by registering identification codes from said user input devices GP and evaluating the amount and/or the frequency of the input data IN provided by said input devices GP to continuously decide whether to register users as allowed players or not.

This dynamic registering and activation scheme provides a solid representation of all active users, thus enabling the system to more efficiently react on all active users playing the game and/or controlling the application. The APA game mechanics is very effective for cinema or theater gaming because it enables a crowd to collectively control the game which responds to the users' inputs and renders the resulting scene in real time on the cinema screen.

The system may take into account the skill level of players that play the game. Thus the system becomes rewarding for players of every skill level and still provides a challenge. The system shall make players feel to have the control of the avatar or the avatars, when the players are controlling the object(s) as a crowd.

A further game mechanics presented here is called "Dynamic Threshold Based Decision Making" (DTBD) and shall provide a better solution for deriving the right control input IN* from those many individual user data inputs IN.

This means that the multi-user computer-controlled video gaming system adapts the decision making for triggering a function by evaluating the amount of input data IN having the same content for finding a majority MJ of conform inputs among all inputs from the users to trigger said function dependent on said at least majority. The system finds a majority of conform inputs among all inputs from the users if the number of conform inputs exceeds a predefined threshold value THV.

It is obvious that many inputs to triggers a reaction will normally cause confusion to the game and in reaction back to the players. To give a readable interface the game mechanics DTBD provides a threshold based decision making. This will be described in the following wherein reference is made to FIGS. 1, 2 and 3:

The players P can influence the course of the game by using the controllers GP and making their inputs via other input/interface devices, e.g. by pressing buttons, moving sticks or the whole gamepad or even by their voice etc. Once a player chooses to trigger an action, his input IN is transmitted to the system and thus his/her "vote" goes into a pool of the votes of all active players. A certain amount of players have to choose an action to trigger a reaction. Therefore a threshold is defined which gives the minimum number of coincident inputs (votes) to trigger said particular action.

Figure 3:
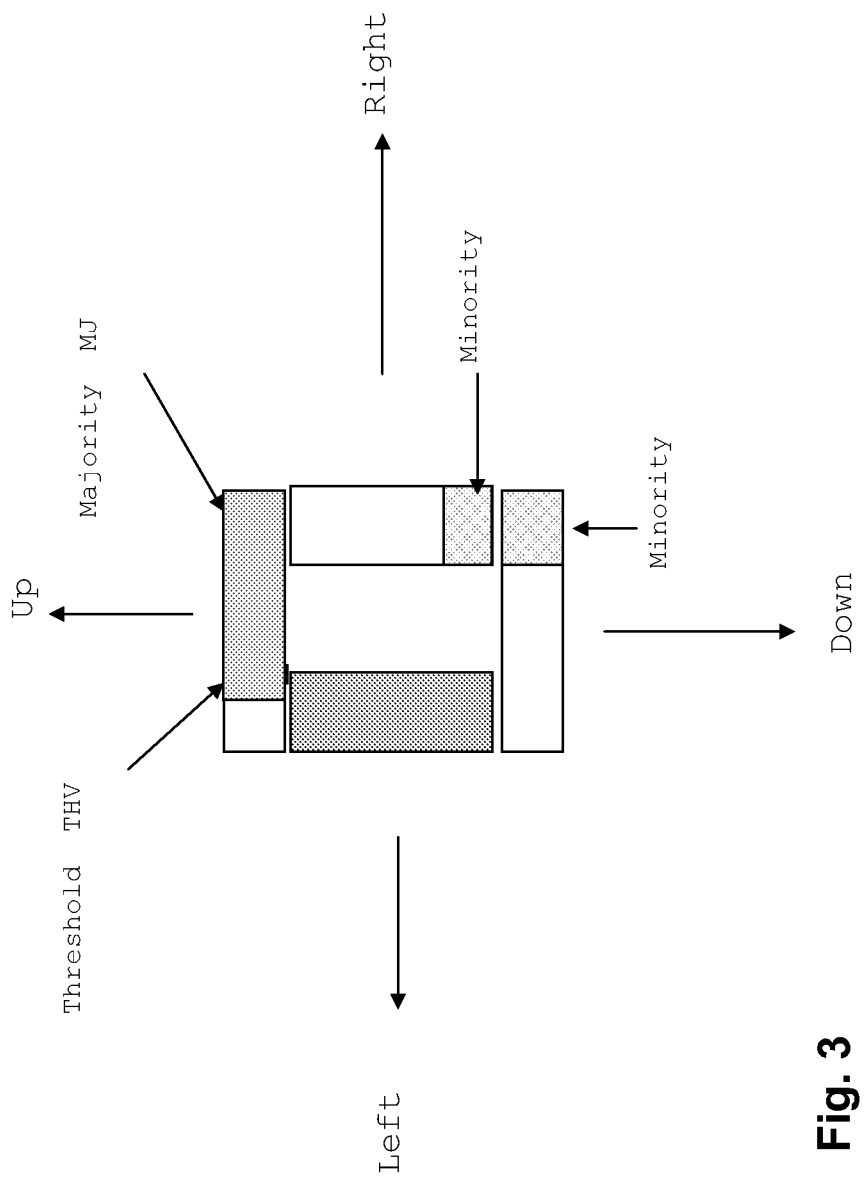
FIG. 3 schematically illustrates a first game mechanic which adapts the decision making for triggering a function in a multi-user controlled game.

As can be seen from FIG. 3 there are four possible actions to be executed by the game, namely a movement of the controlled object (submarine) to the right, to the left, up or down. For illustration the figure shows four bars which represent these four possible choices for the users. Each user can choose one direction. If only a few users vote for a particular direction (see here the bars "Right" or "Down") the corresponding bar will only be filled up slowly and not reach the threshold value THV. If more users join in a vote the corresponding bar will grow faster (see here the "Up" bar) and may reach the threshold value. If a bar reaches the threshold (see bar "Left") the corresponding action will be executed by the game. The illustration of FIG. 3 can be shown on the display screen D to the audience. Thus the users can continuously see how the votes are distributed among the given options (four directions of movement).

Of course each user can then reflect his/her input for a while (as long as the action is not executed) and can change his/her vote. This means that it is allowed that players can overrule their vote and can choose for a different option (direction) and thus the bars will change in size dynamically. What also can change are the threshold marks for the amount of users needed to trigger the action. The action can be triggered instantly when one of the thresholds is reached first. Alternatively the actions can be triggered automatically at certain time intervals wherein that action having the most votes will preferably be triggered (depending on the application).

The DTBD game mechanic enables the system to execute a very dynamic decision making process on the basis of the social behavior of the group. It is possible that votes of the group might exclude each others so that not more than one choice will be allowed to trigger the next action. It is also possible that votes include each other so that two or more choices can be left to trigger the next actions. Preferably a majority of the players will have to reach a given threshold for triggering an action. The DTBD game mechanic always leads to control inputs IN* which are clearly readably by the game application.

Thus a reliable directional navigation can be achieved. This is shown by the example of FIG. 3 as follows:

A minority of players choose direction "Right". Their vote will not trigger the corresponding action (movement to the right).

A minority of players choose direction "Down". Their vote also will not trigger the corresponding action.

No players choose to go "Left". Thus no action is triggered here, too.

The majority of players choose to go "Up". This majority represents a percentage of the total amount of players that is high enough to be above the threshold and therefore triggers the action "Move upwards".

If the majority of players wants to go to a certain direction but this majority is not high enough to surpass the threshold no action will be triggered.

Figure 4:
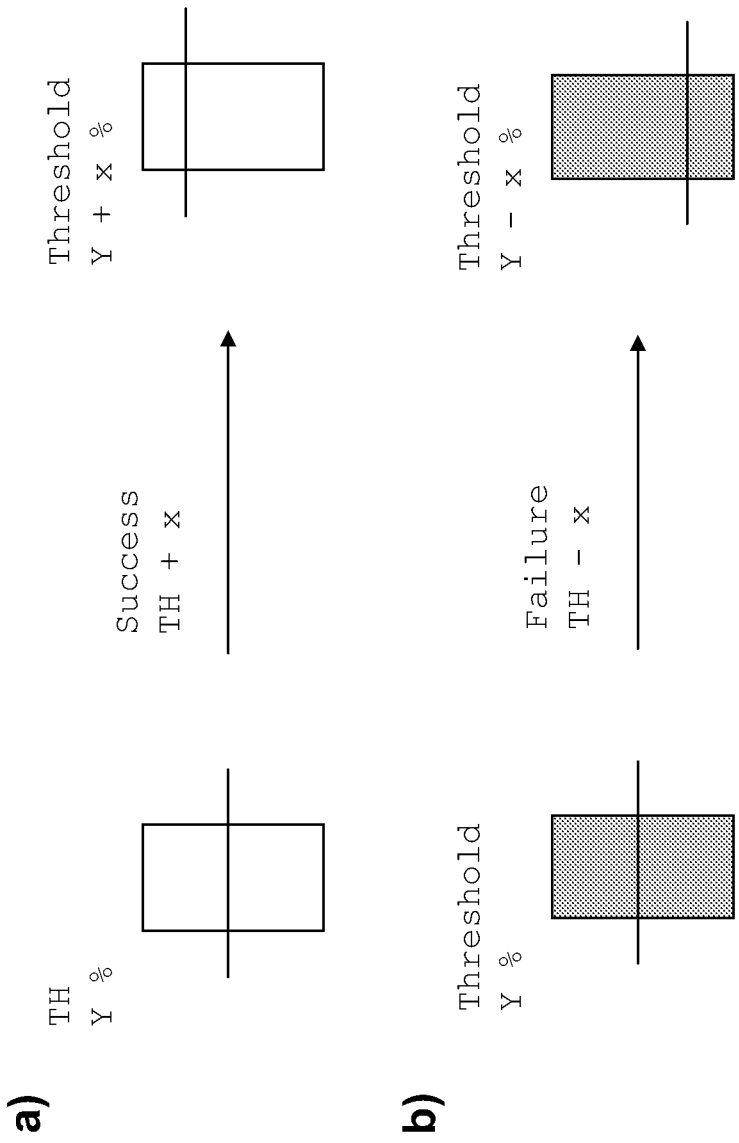
FIG. 4 schematically illustrates a second game mechanic which adapts a difficulty level in a multi-user controlled game.

Another game mechanics called "Adaptive Difficulty Level" (ADL) will now be described in the following (see FIG. 4):

This ADL solves the problem that large groups of people are very hard to evaluate in advance concerning their gaming skill levels. If a group fails too often during a game, the group will get frustrated and stop participating, which will lead to an even worse experience. If most of the players get the impression that the control of an object becomes to be too easy they might also get frustrated and stop playing. Therefore game has to give a reachable challenge for at least most of the players. Further the game shall show the necessity to the group that the players must be well synchronized to reach a well-working collective control. The ADL adapts the skill level such that the better a group plays, the harder the game will be. If the group (partially) fails the game, it will become easier again.

The ADL also adapts the threshold number of players depending on behavior and results from the previous decision making processes. The ADL function will raise the threshold the better the group performs. This ensures the constant need to synchronize the group better and better which in conclusion triggers social interaction. If the group has reached a difficulty level where the group is unable to succeed, the difficulty level will drop again.

In other words: The multi-user computer-controlled video gaming system adapts the difficulty level by continuously evaluating numbers of conform inputs exceeding a predefined threshold TH and by increasing said threshold if said numbers exceed the threshold by more than a given offset value X in terms of quantity and/or frequency of their occurrence.

Example of Rising Threshold:

Players start with a threshold of 50%. In this case the majority (at least 51%) of the players have to choose a certain action to trigger a reaction. If the players perform well in the game (for example, avoid obstacles or collect certain items) this threshold will rise in predefined steps. As shown in FIG. 4a the threshold TH will rise by value X. If the threshold reaches a high value (for example a value of 75%), this will create the necessity for players who did not participate actively before or did not choose the direction the majority of players wanted to choose to synchronize with the group to succeed. A success will then lead to an even higher threshold. Players who were inactive for long enough that their controller was deactivated are not taken into consideration to calculate the percentage needed for the threshold.

Example of Falling Threshold:

If the threshold reaches a value that is too high for the group to synchronize (for example 95%) to continue to succeed (for example run into obstacles, do not collect bonus items) the threshold will start to drop upon failing conditions (run into obstacles, etc.) in predefined steps. As shown in FIG. 4b the threshold TH may fall by value X. Once the threshold reaches a value where the group is able to synchronize again and be successful it will start to rise again, creating a constant need for synchronization and a challenge for the players.

Adaptive Score System:

Due to the limited amount of interactivity in a crowd game, scores tend to be in the same range even if played by groups of various skill levels. Score is generated by successful playing (i.e. not crashing into objects, collecting certain items).

Figure 5:
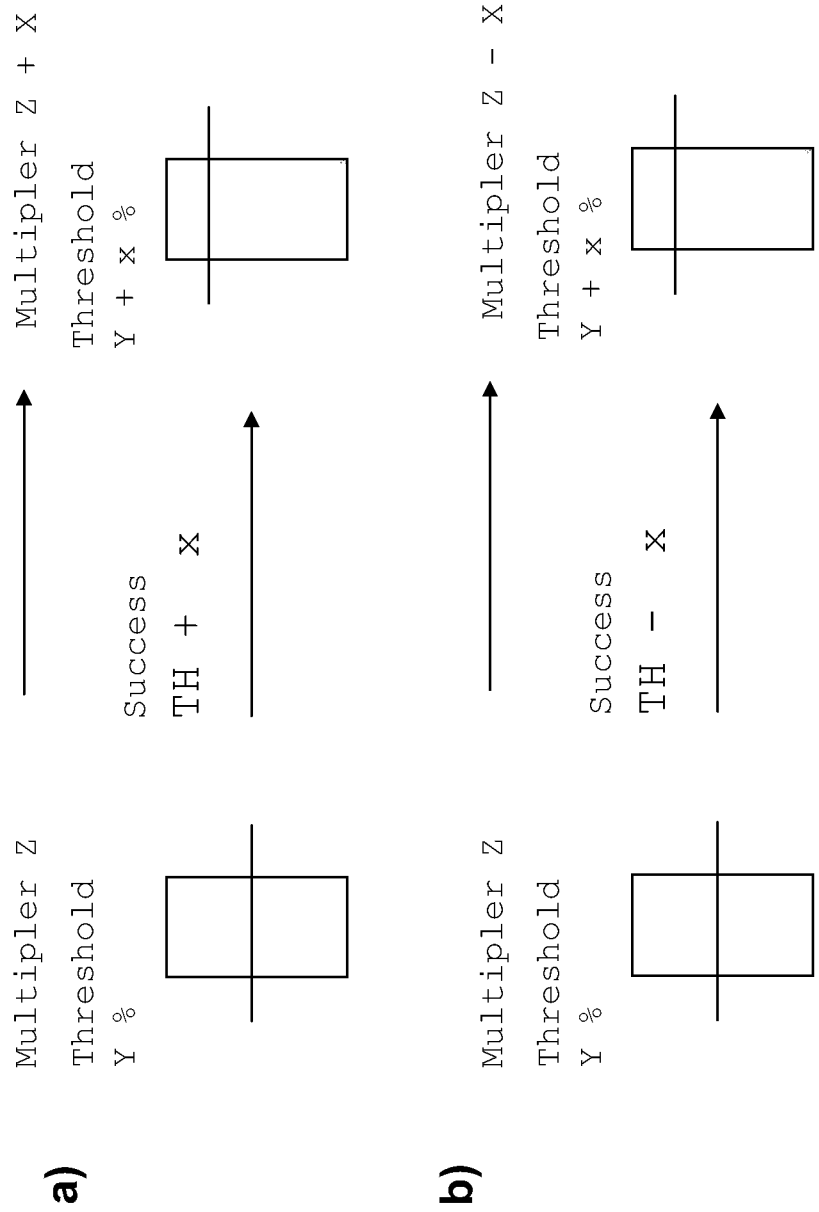
FIG. 5 schematically illustrates a third game mechanic which adapts a score system or scheme in a multi-user controlled game.

The Adaptive Score System is connected to the Adaptive Difficulty System to create a wide range of possible scores.
Description Adaptive Score System (ASS):

The rising/falling threshold (see ADL) is directly connected to a rising/falling score multiplier to guarantee a high score variation among groups. This means that a high threshold would lead to a high difficulty which would then lead to a high score multiplier and finally to a high score if the group plays well. This is illustrated by FIG. 5a).

Thus the system adapts the score system by raising a score level if said threshold (TH) is increased.

As soon as the players fail the threshold drops, which makes the game easier which would then lead to a lower score multiplier and a lower score. This is illustrated by FIG. 5b).
The so-Called "Rail System":

Various playtests with conventional systems have shown that using a free movement for players in a crowd game causes unsatisfactory results. Players will massively counter steer previous movements which will lead to an s-shaped motion of the avatar. This will not only create unpleasant visual results but also destroy the feeling of the players to be in control. To solve this problem the invention limits the possibilities of movement by introducing a "rail system" to give players the illusion of a freely controlled movement without actually providing full freedom.

The "rail system" function creates a number of predefined paths for the players. The amount of rails on the x and y axis can be set by the designer. This is shown by the example of FIG. 6a) showing a rail system of 4×4 rails.

The system controls the movements of objects on predefined paths or rails R by defining a grid GR of allowed position values where objects are allowed to be displayed and by continuously deciding dependent on the users inputs where to display the object in the next frame.

Figure 6:
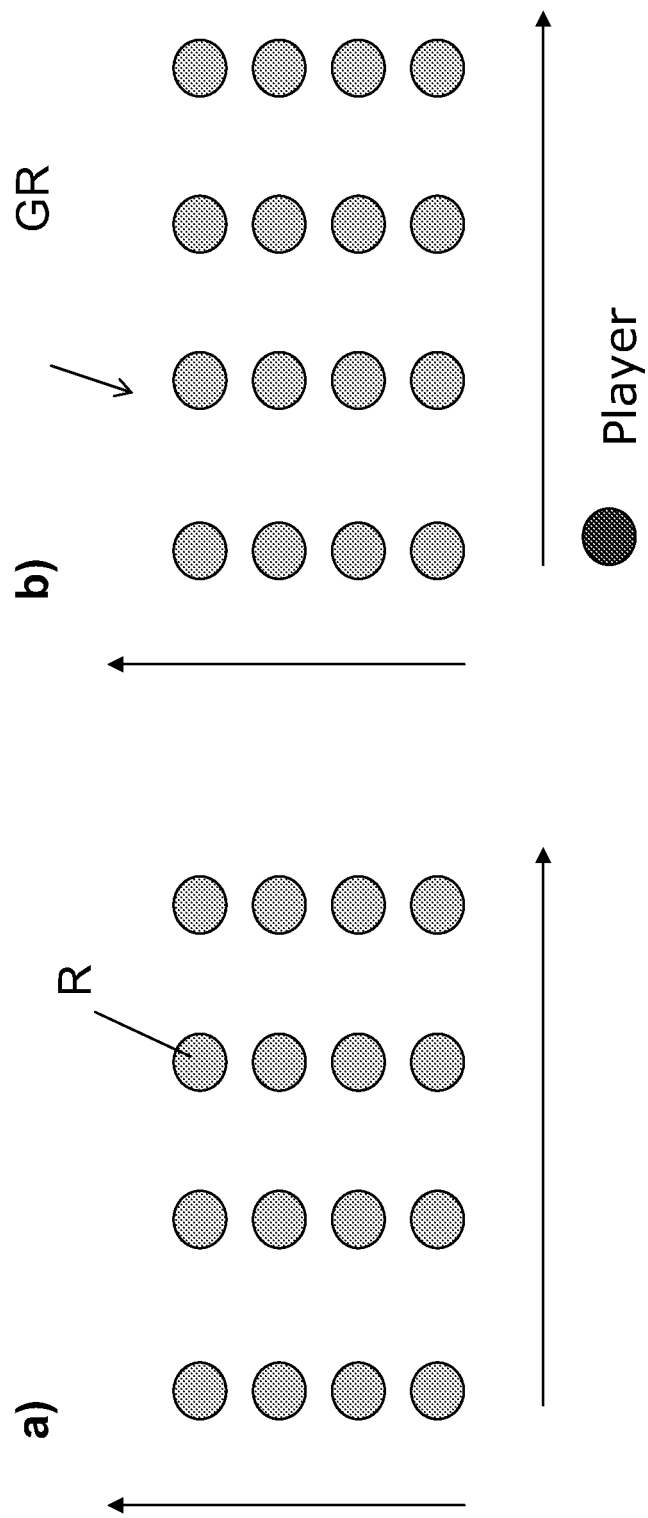
FIG. 6 schematically illustrates a fourth game mechanic which allows improved movements of objects in a multi-user controlled game.
Figure 6:
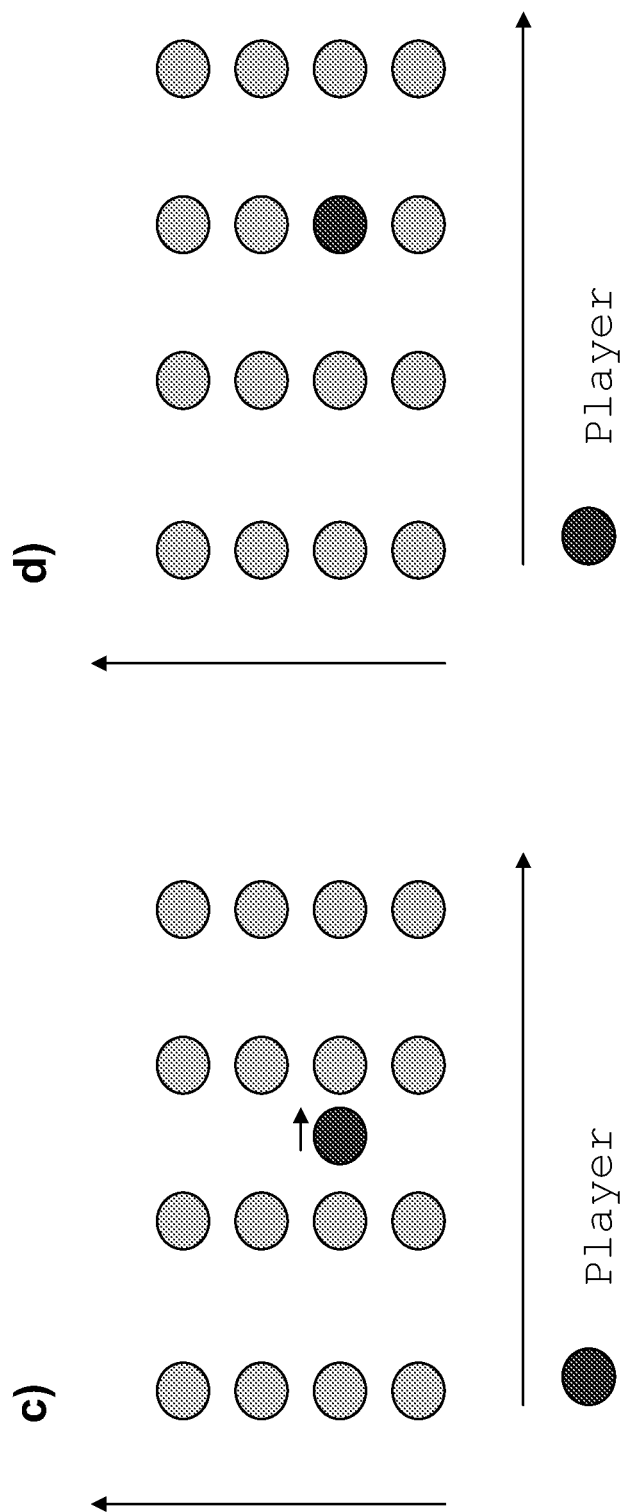

The single player (or a group of players) start(s) the game on a predefined rail (see FIG. 6b). If the player moves from one rail to the next, this movement is guided by a threshold-based decision so that the player cannot influence the movement of the avatar while being in the transition from one rail to the next. In the present example the player chooses to move to the right (see FIG. 6c). Once the players arrive on the next rail the decision making process starts again, guaranteeing a stable movement (see FIG. 6d).
Photo Game Play Mechanic:

The photo game allows a group of players to control a photo camera in an easy way and take pictures of beautiful scenery and exciting moments. While the gameplay is fun (i.e. succeed in a collaborative effort), the players are also rewarded with an object of their own creation as the picture is visible, it's a tangible proof of success.

The general mechanic of the gameplay is using the skills nearly every user has, namely the skill to take pictures which is generally known by almost everyone, and is also enjoyed by many as a rewarding way to remember joyful experiences.

Thus the system triggers a function, in particular a photo-camera function, by evaluating the amount of input data IN having the same content for finding a majority of conform inputs among all inputs from the users to trigger said function dependent on said majority.

As it is illustrated by FIGS. 7-11, this game mechanic comprises a plurality of functions and/or mechanisms:
One Group of Functions Refers to a so-Called Motion Mechanism:

I) Buttons are an example of preferred input devices/elements since they just need to be pressed by the users. In the described embodiment here, there is a quite simple button layout which is divided into "movement" and "action".

i) Movement(s) of the object(s) is/are controlled by said pressing said buttons. The players can chose in which direction they want to move the camera. The possible directions are up, down, left and right. Depending on how many percent of the players press a specific direction simultaneously, the camera will move there as long as the players choose the direction. The game reacts with a certain degree of dampening to avoid a jittering camera motion, i.e. the motion is smoothed.

ii) Action is triggered by a specific button or other input element. The players are able to take a photo of specific scenery or creatures. To do so the user just needs to push said button on the controller. This action is handled with the above described threshold mechanic (see FIGS. 3-5). A certain amount of players (e.g. the majority) have to press the photo shoot button to actually take a picture.

II) Targeting is one function which provides the following effects:

In some challenges it is necessary to move the camera around for reaching a target or keeping a specific position. In this case the players need to use the movement directions of their controller.

The further the target is away the faster the camera is able to move into that direction. If the camera gets closer the movement speed is slowed down which allows a more controlled steering to actually focus on the target. Thus the players are able to place the camera onto the target with precision when needed, and move as fast as necessary towards the target when precision is not needed. For a simple implementation the speed changes can be arranged in steps, for example in 3 areas (see FIG. 7), each of it is assigned to an adjusted movement speed. The movement speed can also be based on the distance towards the target instead of defining certain areas around the target. This depends on the actual implementation of the functionality in a specific application.

Figure 7:
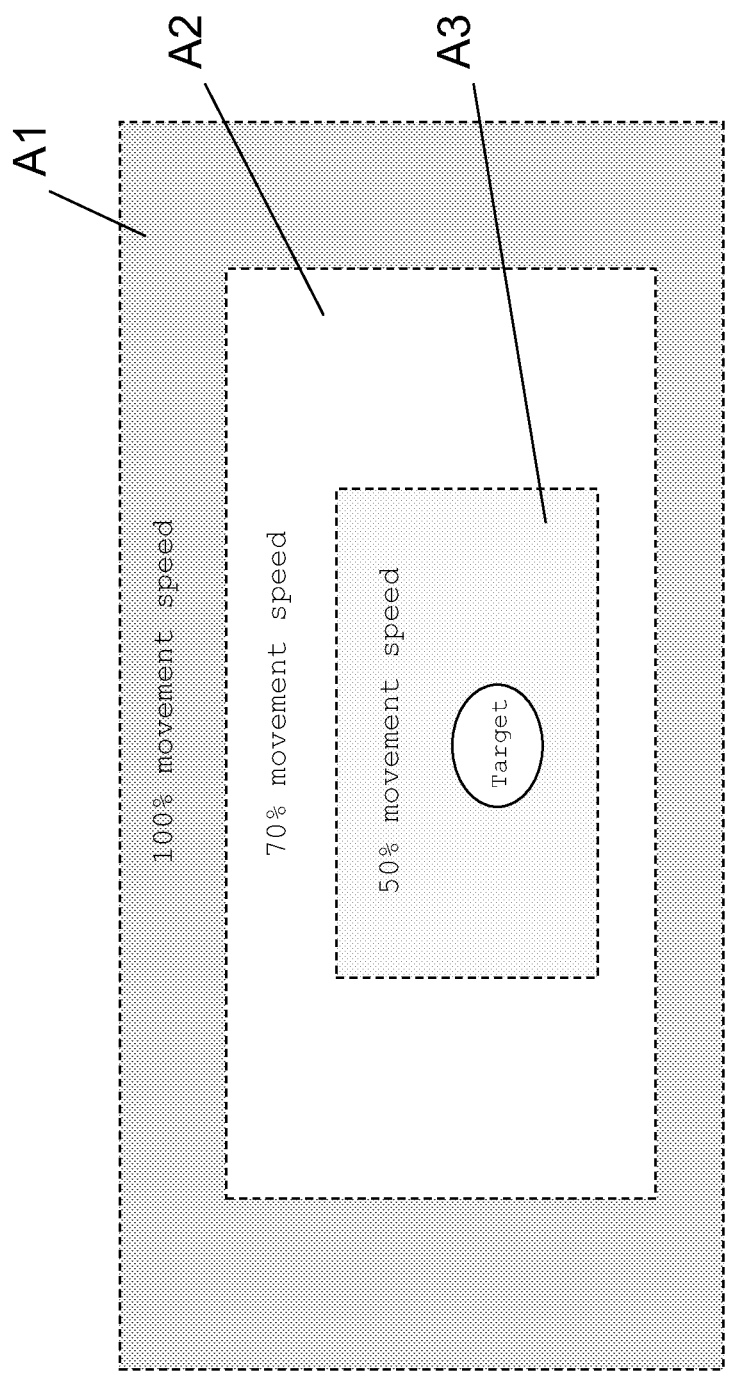
FIG. 7 schematically illustrates a fifth game mechanic which allows improved targeting of movements in a multi-user controlled game.

As it is illustrated by FIG. 7 there are 3 speed zones, the outer one defining full speed (100%), the inner ones defining reduced speed (70% or 50%). The speed change of the movement happens automatically. Instead of well-defined zones there could be a dynamic design of areas so that speed will change more fluently while players steer towards the target. In any case, even in the shown example of 3 areas this targeting function achieves to smooth the movement speed.

In other words: The system targets the movement of an object, in particular of a camera, by defining within the displayed frame different areas surrounding the position of a target to which the object shall move, wherein each area matches an area of a speed value being allowed for moving said object. The area A3 which is closest-by or covers the target T matches the lowest speed value and the areas A1, A2 which are more far away from said target match higher speed values.

III) Head Bobbing (describes the subtle movement of a first person view perspective simulating natural head motion) is a further function of game mechanics:

In every area during the photo gameplay when the camera is standing still there will be activated a slight head bobbing automatically, unless the camera featured in the game is meant to be standing very still. This ensures that the audience is reminded of the challenge and stays sharp. For example if the audience controls an underwater vehicle they are reminded about the fact that the vehicle is still underwater being affected by the water current.

As a result the system displays a wave effect, in particular head bobbing, if the users are inactive for a predefined period of time.

The bobbing doesn't distract the audience or increases the difficulty. Thus it is just a minor visual effect, but makes the game more attractive and readable.

IV) The Picture Display is also provided with new functions:

Another reward for the audience is to have a look at the beautiful picture they have just taken. In this case the picture is displayed in a zoomed version on the screen right after it has been taken by the players.

Figure 8:
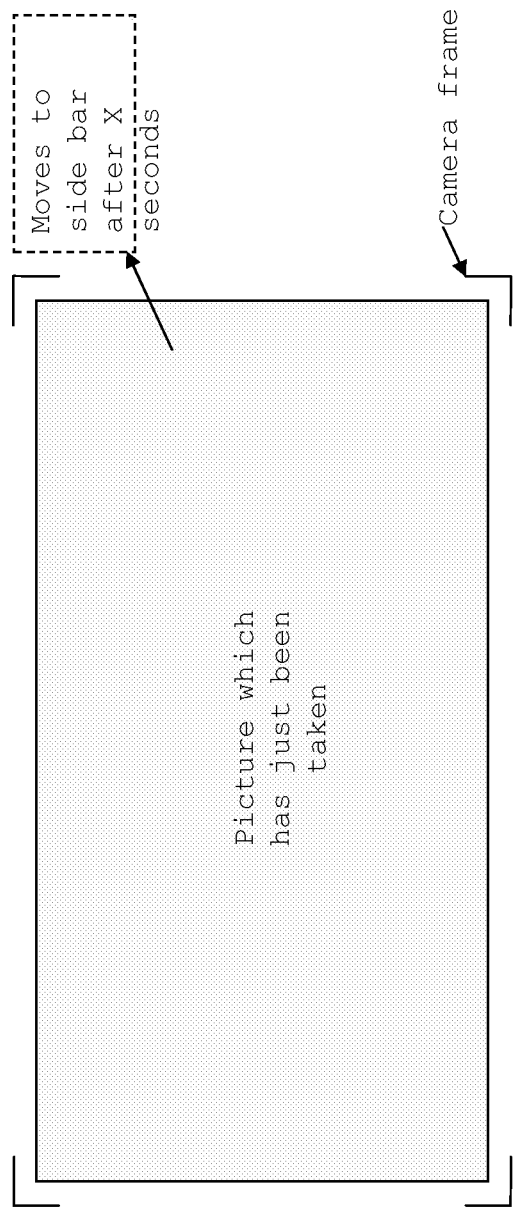
FIG. 8 schematically illustrates a sixth game mechanic which relates to a camera function and allows improved re-displaying of taken photographs.
Figure 9:
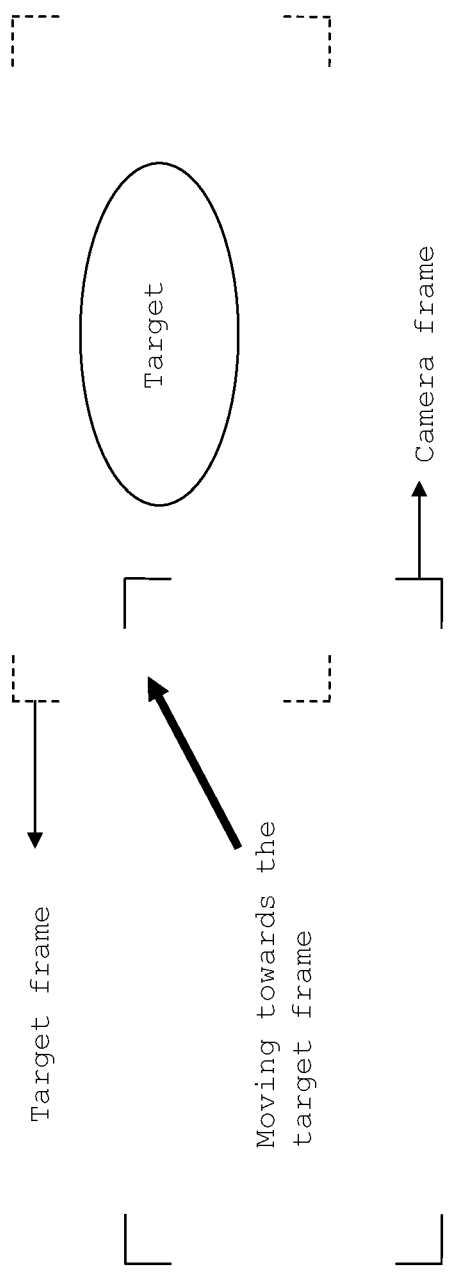
FIG. 9 schematically illustrates a seventh game mechanic which relates to a camera function and allows improved targeting of camera movements.
Figure 10:
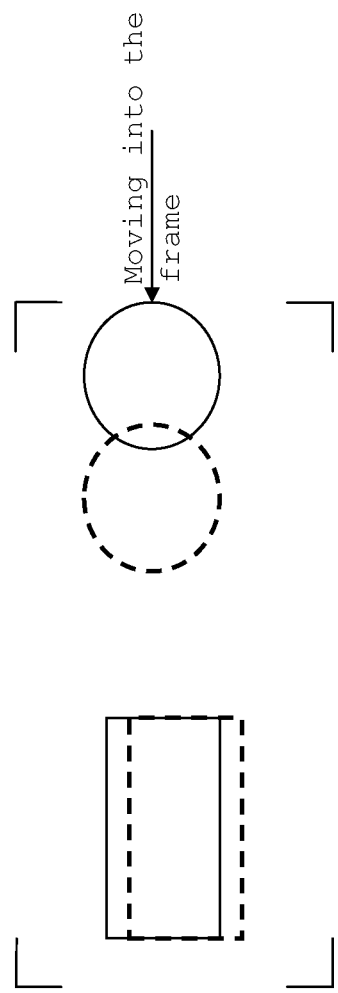
FIG. 10 schematically illustrates an eighth game mechanic which relates to a camera function and allows another improved targeting of camera movements.

It remains there for a specific amount of time and either disappears or moves to the display bar afterwards. The bar can be placed anywhere on screen, preferably at the borders to move them out of the area of the main attention. An example of such a new picture display is shown in FIG. 8.

V) Photo Taking Mechanic means a new and powerful camera function:

This function includes the definition of "beauty" within the displayed pictures and/or film sequences. To define what makes a picture beautiful the application correlates several attributes of the scenery together, i.e. if there is movement in the scene it will be where colourful objects are placed, while the areas surrounding it are plain and less attractive.

The attention of the audience is automatically focused on the "nice" spots creating a coherent group action.

This is especially important for the later described "Freestyle Photo Challenge".

The function also includes sketches to advertise beautiful views: To help the players learn what should be photographed the game presents the players with a sketch of the scenery in question. This sketch is an easy to recognize image of a scene that will be shown a short time later. The players' combined expectations are set to motivate a synchronized action.

Here is an Example of Such a Situation:

The players control an underwater camera.

The game shows the players a sketch of a manta ray in front of sun rays.

The players then see the manta ray approaching a fitting scene, where the manta gets into position in front of the sun.

The players have to wait for the right moment, witnessing the scene getting closer to the preferred shot.

The successful result is a photograph that shows perfect framing and motives.

In other word: The system redisplays pictures or sketches thereof in a subarea of the display, in particular redisplays pictures or sketches which were taken by use of a game object having a camera function. The system can also redisplay objects or sketches thereof in a subarea of the display, in particular redisplay objects which have been displayed in former frames.

The Camera Trigger is a function which can also be applied to the conjointly input and control by many users. The overall goal is to make it readable when players need to press and how close they are to take a picture. For this an icon is shown onscreen telling the players how many are ready to take a picture. The icon starts as an empty circle and filling up like a pie chart the more players press the photo shoot button. To actually take a picture it is required for a specific percentage of the players to press the button more or less simultaneously (i.e. inside a short time frame).

To avoid players tricking the system or fooling around there are mechanics which are:

| Issue | Solution |
| --- | --- |
| Holding the button pressed continuously | After X seconds the button doesn't count as pressed anymore. |
| Continuously pressing and releasing the button | Only every X seconds a button press is being recognized by the system |

VI) Challenges are generated as follows: While the photo gameplay core mechanics (shooting pictures and moving the camera around) remain the same, there are several ways to enrich the Gameplay with a variation of challenges.

These challenges are used in all photo gameplay areas and are sorted depending on their difficulty, beginning with the lowest. This ensures that players are not getting overwhelmed by too demanding challenges in the beginning and it also supports the steady increasing interest curve in the game.

Limited Resources is one function to make the challenge more exciting. Therefore only limited resources are made available for taking pictures. This can be a time limit or a picture limit or even both at once.

Best Shot Challenge is another function to realize a Challenge. This challenge is about moving the camera to a specific frame on the display and making a picture afterwards while remaining on that frame (see FIG. 9).

With respect to the control function(s) the players can choose any directions they want to move the camera to the required position. Taking a picture simply requires people to press one button.

With respect to the functionalities it can be said that the Direction where target frame is located is being displayed on the Head-up-Display (HUD). The closer the camera frame matches the target frame the higher the rating of the picture is.

An example of a gameplay using said mechanism is an undersea photo safari: The goal is to make an image of the manta ray while he is floating around. The players need to move the camera frame onto the target frame which is located on the manta ray and take a picture (see FIG. 9).

The invention achieves that also a Keep Position Challenge can be solved (see FIG. 10): This challenge is about trying to stick to the target frame and take a nice picture while the players are distracted with random movement changes that needs to be compensated.

In the shown example the Camera is positioned on the target frame in the beginning. Then the Camera moves around randomly and the players need to press the correct direction to compensate the random movement. The closer the camera frame matches the target frame the higher the rating of the picture is the moment the players take a picture.

What also can be solved is a "Right Moment" Challenge: This challenge is about making a picture in the right moment to gain the maximum score points. Overall there are two proposals how to realize this challenge in different ways which are described further below.

This function may have a sketch based design: In this version of the "right moment" challenge the camera frame includes one or more sketches that indicate how the final picture should look like. The sketch can either indicate a fix or movable target and it is up to the audience to decide when the right moment of taking the picture is.

The Functionality can comprise the following features:

Camera frame with sketch(es) is placed somewhere near the target frame in the beginning.

The closer the fix/movable objects match the sketch the higher is the score when taking a picture.

Players can wait until the scene matches the sketch and can actively move the camera to match the sketch.

The audience can take a picture anytime, but should wait for the right moment.

As an example a gameplay can be performed, wherein the goal is to make a picture of a coral and a fish next to it. While the coral is a fix target that doesn't move the fish will swim around and the players have to wait until it matches the sketch (see FIG. 10).

The function can be Reflex based: In this challenge the players get told ahead what kind of objects should be part of the picture. These objects then appear randomly on the screen and it is up to the player to decide when the best moment to make the picture is. It is the players choice to react fast to get the shot. This challenge is reaction based only.

The Functionality can comprise the following features:

The camera moves to a fixed spot in the beginning from where the pictures are taken.

Objects randomly appear in the camera frame.

The players can take a picture whenever they want.

The closer the taken picture is compared to the reference the higher the reward is.

Another function can generate a Freestyle Photo Challenge: In this challenge the audience itself can decide when to take a photo, i.e. decide together if a view is beautiful enough or worth to take a photo of. To ease the decision there are clear areas that are plain and not spectacular followed by areas with much more appeal. These defined areas allow the crowd to come to an agreement upon the decision to shoot a photo.

With respect to the control function(s) the Players can choose any directions they want to move the camera to the required position. Taking a picture requires people to press one button.

The Functionality can comprise the following features:

The Camera is hovering in the water in front of an area that provides several beautiful spots, but at least one.

The spots are technically pre-defined in the application.

The more percent of the pre-defined shape is framed in the camera when taking a picture the higher the beauty of the picture is rated, e.g. the score is higher.

Pictures taken without a pre-defined shape inside the camera frame are considered as low quality pictures.

Figure 11:
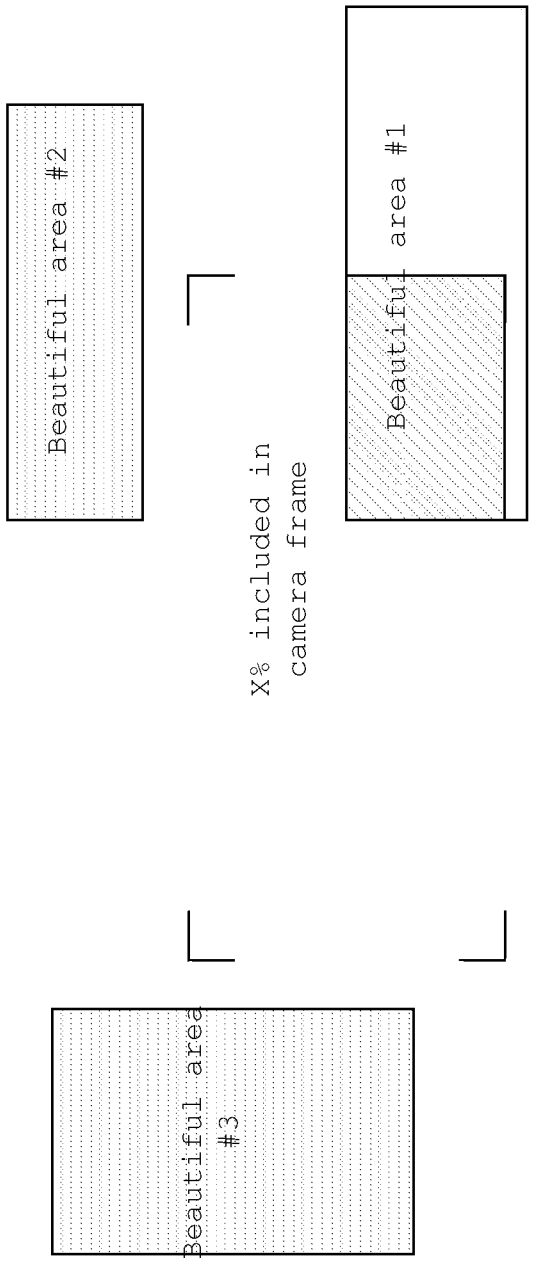
FIG. 11 schematically illustrates a ninth game mechanic which relates to a camera function and allows another improved targeting of camera movements.

For example there are three possible spots in total where to make absolutely beautiful pictures, but the audience themselves have to pick an area they think is good enough for a photo (see FIG. 11).

Figure 2:
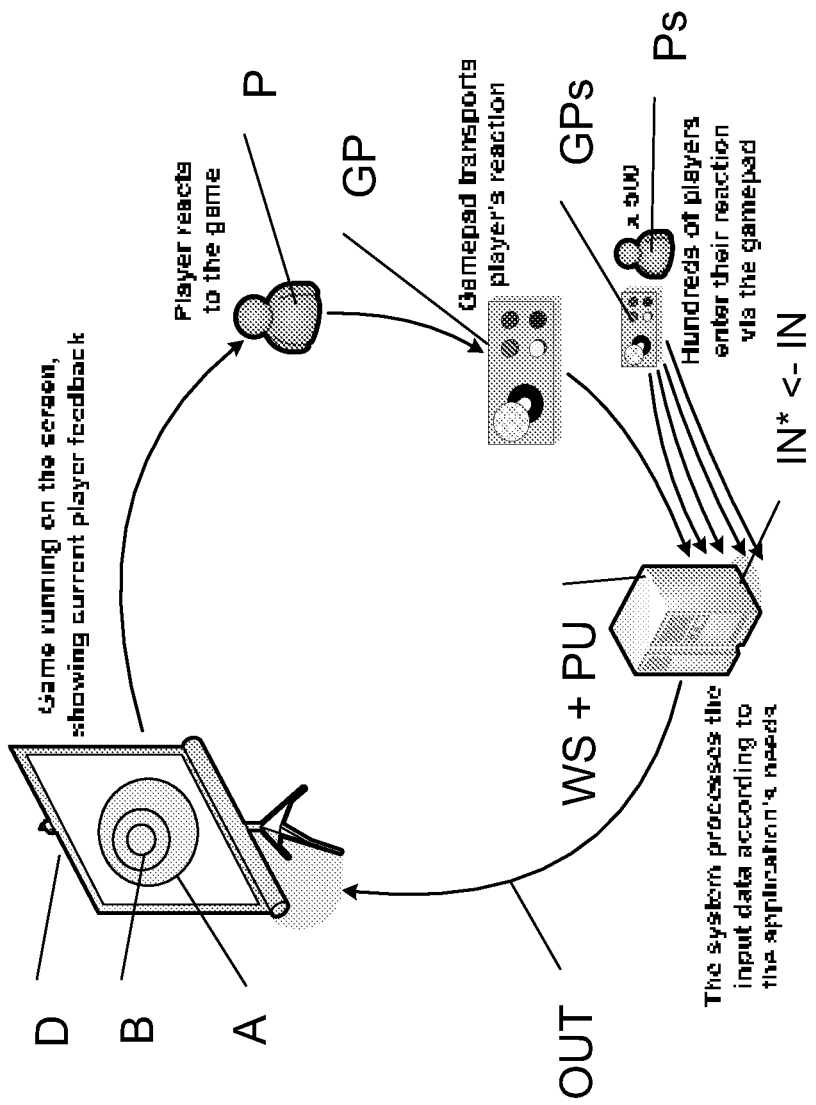
FIG. 2 schematically illustrates the steps of a method for performing a game with game mechanics of the present invention.

The above described mechanics are provided by the system of FIGS. 1 and 2. Further to the already described components the system can also comprise a feedback data link between the computing device (workstation) WS and the processing unit PU. This link is used to modify and/or adapt the processing of the input data IN to the current needs of the running application. This preparation and processing of the user input data IN can be flexible and may react on the actual needs of the system.

The user input devices GP may comprise input sensor means, in particular buttons and sliders, to generate the user input data IN for each user P as raw data representing his or her individual input. The at least one computing device WS can also be realized by game server and the processing unit PU can be realized as an external or internal part of said server.

What can also be seen from the FIG. 1 is that the system can easily handle user input data from one or more groups of users separately. Thus a first group of users can collectively control their objects, i.e. their submarine and camera, whereas a second group can collectively control different objects being assigned to this second group. This solution is very attractive for running game competitions between two or more groups. Many other scenarios can be realized by the present invention.

The FIG. 2 also schematically illustrates the steps of said method which provides a dynamic feedback loop for jointly controlling at one certain object, such as a vehicle with a camera, within a running video game:

The software application which runs on the workstation WS (also see FIG. 1) may send a request to the system on what data is valid at any current time. The system, in particular the processing unit PU (also see FIG. 1), then processes the input data IN, by e.g. filtering valid input data from invalid and by compressing the valid information from the users to a discreet command represented by control data IN*. These data IN* can further contain additional metadata like (e.g. how many users were involved in valid/invalid data, which input device was used etc.). These data IN* are then transferred to the actual application.

In the following reference is made again to FIG. 1 for further describing the compression and filtering of multiple user inputs:

i) First the users or players P use the input devices to produce individual control inputs. These input data IN are then transferred as raw data to the data processing unit PU.

ii) The processing unit PU then processes and transforms the raw data into compressed data (control input data IN*) according to current rules which are defined by the game application. The processing unit can be a separate device (e.g. a PC), but can also be a specific application running on the workstation WS or just a part of the actual application running as a subroutine.

iii) The workstation WS running the actual application gets the processed input data IN*. The application changes its current state based on the input data. Any change in the requirements for future input data is transferred back to the processing unit PU by sending corresponding feedback data FB.

iv) The workstation WS then sends according to the new application state the output OUT to the display devices, like video screens and/or audio equipment, and optionally to other output devices such as electro-mechanical devices to produce gamepad vibrations the like. Hence the users see, hear and optionally feel the output as a result of the conjointly controlled action and can react on it again.

What is claimed is:

1. A multi-user computer-controlled video gaming system for performing a game among a plurality of users (P), the system comprising:

at least one display device (D) for displaying video game motion pictures to the plurality of users (P);

a plurality of user input devices (GP), at least one for each user (P), providing user input data (IN) to the computer-controlled video gaming system as raw data;

a processing unit (PU) receiving and processing the raw data of the user input data (IN) from the plurality of input devices (GP) to generate control input data (IN*) for a conjoint control of at least one game mechanic of the performed game;

at least one computing device (WS) executing a game software application for performing said game, the at least one computing device (WS) being controlled by said control input data (IN*) for providing output (OUT) to the display device (D) to display the video game motion pictures dependent on said at least one conjointly controlled game mechanic; and a feedback data link (FB) between the at least one computing device (WS) and the processing unit (PU) configured to transfer feedback data corresponding to a change of requirements for control input data (IN*) from the at least one computing device (WS) back to the processing unit (PU).

2. The multi-user computer-controlled video gaming system of claim 1, wherein the system provides at least one of the following game mechanics:
Adapting the number of allowed players,
Adapting the decision making for triggering a function,
Adapting a difficulty level,
Adapting a score system,
wherein the adapting is based on the activity of the users in terms of quantity and/or quality.

3. The multi-user computer-controlled video gaming system of claim 2, wherein the system adapts the number of allowed players by registering identification codes from said user input devices (GP) and evaluating the amount and/or the frequency of the input data (IN) provided by said input devices (GP) and based on the evaluating continuously adapts the number of allowed players by deciding whether to register additional users as allowed players or not.

4. The multi-user computer-controlled video gaming system of claim 2, wherein the system adapts the number of allowed players by registering identification codes from said user input devices (GP) and evaluating the amount and/or the frequency of the input data (IN) provided by said input devices (GP) and based on the evaluating continuously adapts the number of allowed players by deciding whether to register additional users as allowed players or not;
wherein the system adapts the decision making for triggering a function by evaluating the amount of input data (IN) having the same content for finding a majority (MJ) of conform inputs among all inputs from the users to trigger said function dependent on said at least majority;
wherein the system finds a majority of conform inputs among all inputs from the users if the number of conform inputs exceeds a predefined threshold value (THV); and
wherein the system adapts the difficulty level by continuously evaluating numbers of conform inputs exceeding a predefined threshold (TH) and by increasing said threshold if said numbers exceed the threshold by more than a given offset value (X) in terms of quantity and/or frequency of their occurrence.

5. The multi-user computer-controlled video gaming system of claim 1, wherein the system provides at least one of the following game mechanics:
Moving objects on predefined paths,
Triggering a function, in particular a photocamera function,
Targeting movements,
Displaying an awaking effect, in particular head bobbing,
Re-displaying pictures or sketches thereof,
Pre-displaying pictures or sketches thereof,
Pre-displaying objects or sketches thereof.

6. The multi-user computer-controlled video gaming system of claim 2, wherein the system adapts the decision making for triggering a function by evaluating the amount of input data (IN) having the same content for finding a majority (MJ) of conform inputs among all inputs from the users to trigger said function dependent on said at least majority.

7. The multi-user computer-controlled video gaming system of claim 6, wherein the system finds a majority of conform inputs among all inputs from the users if the number of conform inputs exceeds a predefined threshold value (THV).

8. The multi-user computer-controlled video gaming system of claim 7, wherein the system adapts the difficulty level by continuously evaluating numbers of conform inputs exceeding a predefined threshold (TH) and by increasing said threshold if said numbers exceed the threshold by more than a given offset value (X) in terms of quantity and/or frequency of their occurrence.

9. The multi-user computer-controlled video gaming system of claim 8, wherein the system adapts the score system by raising a score level if said threshold (TH) is increased.

10. The multi-user computer-controlled video gaming system of claim 5, wherein the system controls the movements of objects on predefined paths or rails (R) by defining a grid (GR) of allowed position values where objects are allowed to be displayed and by continuously deciding dependent on the users inputs where to display the object in the next frame.

11. The multi-user computer-controlled video gaming system of claim 5, wherein the system triggers a function, in particular a photo camera function, by evaluating the amount of input data (IN) having the same content for finding a majority of conform inputs among all inputs from the users to trigger said function dependent on said majority.

12. The multi-user computer-controlled video gaming system of claim 5, wherein the system displays an awaking effect, in particular head bobbing, if the users are inactive for a predefined period of time.

13. The multi-user computer-controlled video gaming system of claim 5, wherein the system redisplays pictures or sketches thereof in a subarea of the display, in particular redisplays pictures or sketches which were taken by use of a game object having a camera function.

14. The multi-user computer-controlled video gaming system of claim 5, wherein the system redisplays objects or sketches thereof in a subarea of the display, in particular redisplays objects which have been displayed in former frames.

15. The multi-user computer-controlled video gaming system of claim 1, wherein the user input devices (GP) comprise input sensor means, in particular buttons and sliders, to generate the user input data (IN) for each user (P) as the raw data representing his or her individual input.

16. The multi-user computer-controlled video gaming system of claim 1, wherein the at least one computing device (WS) is realized by a workstation or game server and wherein the processing unit (PU) is realized as an external or internal part of said workstation.

17. A method of controlling a game running on a multi-user computer-controlled video gaming system and being performed among a plurality of users (P), the system comprising at least one display device (D), a plurality of user input devices (GP), a processing unit (PU), at least one computing device (WS) executing a game software application for performing said game and a feedback data link (FB) between the at least one computing device (WS) and the processing unit (PU), the method comprising the steps of:
providing user input data (IN) which are generated by the plurality of user input devices (GP) as raw data;
receiving and processing the raw data of the user input data (IN) from the plurality of user input devices (GP) by the processing unit (PU) to generate control input data (IN*) for a conjoint control of at least one game mechanic of the performed game;
conjointly controlling by said control input data (IN*) the at least one computing device (WS) for executing the game software application and for providing output (OUT) to the display device (D) to display the video game motion pictures dependent on said at least one conjointly controlled game mechanic; and transferring feedback data corresponding to a change of requirements for control input data (IN*) from the at least one computing device (WS) back to the processing unit (PU) via the feedback data link.

18. The method of claim 17, wherein at least one of the following game mechanics is provided:

Adapting the number of allowed players,
Adapting the decision making for triggering a function,
Adapting a difficulty level,
Adapting a score system, wherein the adapting is based on the activity of the users in terms of quantity and/or quality.

19. The method of claim 17, wherein at least one of the following game mechanics is provided:

Moving objects on predefined paths,
Triggering a function, in particular a photo camera function,
Targeting movements,
Displaying an awaking effect (e.g. head bobbing),
Re-displaying pictures or sketches thereof,
Pre-displaying pictures or sketches thereof,
Pre-displaying objects or sketches thereof.

20. A multi-user computer-controlled video gaming system, for performing a game among a plurality of users (P), the system comprising:

at least one display device (D) for displaying video game motion pictures to the plurality of users (P);

a plurality of user input devices (GP), at least one for each user (P), providing user input data (IN) to the computer-controlled video gaming system;

a processing unit (PU) receiving and processing the user input data (IN) from the plurality of input devices (GP) to generate control input data (IN*) for a conjoint control of at least one game mechanic of the performed game;

at least one computing device (WS) executing a game software application for performing said game, the at least one computing device (WS) being controlled by said control input data (IN*) for providing output (OUT) to the display device (D) to display the video game motion pictures dependent on said at least one conjointly controlled game mechanic, wherein the system provides at least one game mechanic of targeting movements, wherein the system targets the movement of an object, in particular of a camera, by defining within a displayed frame different areas surrounding a position of a target to which the object shall move, wherein each area defines a speed value being allowed for moving said object.

21. The multi-user computer-controlled video gaming system of claim 20, wherein an area (A3) which is closest-by or covers the target (T) defines a lowest speed value and the one or more areas (A1, A2) which are more far away from said target define higher speed values.

* * * * *